United States Patent [19]

Goossens

[11] Patent Number: 4,939,010
[45] Date of Patent: Jul. 3, 1990

[54] CERAMIC FLOORING TILE, SET OF MUTUALLY DISTINGUISHABLE FLOORING TILES

[76] Inventor: Johannes F. H. Goossens, Chambertinlaan 12, 6213 EW Maastricht, Netherlands

[21] Appl. No.: 216,278

[22] Filed: Jul. 8, 1988

[30] Foreign Application Priority Data

Jul. 8, 1987 [NL] Netherlands ............... 8701601

[51] Int. Cl.$^5$ .................................... B32B 3/14
[52] U.S. Cl. ............................. 428/49; 428/47; 428/48; 428/210; 428/212; 428/913.3
[58] Field of Search ............... 428/49, 48, 913.3, 210, 428/47, 212

[56] References Cited

U.S. PATENT DOCUMENTS

| 1,390,244 | 2/1921 | De Bas | 264/74 |
| 1,453,728 | 6/1921 | Rhodes | 428/47 |
| 1,677,716 | 7/1928 | Greene | 156/654 |
| 1,727,580 | 9/1929 | White | 264/23 |
| 2,654,912 | 10/1953 | Burchenal | 264/60 |
| 3,627,861 | 12/1971 | Timke | 428/49 |
| 4,321,028 | 3/1982 | Van de Caveye | 425/217 |
| 4,546,025 | 10/1985 | Vaisman | 428/47 |

FOREIGN PATENT DOCUMENTS

| 401251 | 3/1934 | Belgium . |
| 0024237 | 2/1981 | European Pat. Off. . |
| 1182572 | 11/1964 | Fed. Rep. of Germany . |
| 2529721 | 1/1977 | Fed. Rep. of Germany . |
| 3151654 | 7/1982 | Fed. Rep. of Germany . |
| 3147687 | 6/1983 | Fed. Rep. of Germany . |
| 611493 | 9/1926 | France . |
| 839366 | 4/1939 | France . |
| 360788 | 11/1931 | United Kingdom . |
| 1318584 | 5/1973 | United Kingdom . |

OTHER PUBLICATIONS

European Search Report–Oct. 1988.
Netherlands Search Report–Jul. 1987.

Primary Examiner—Ellis P. Robinson
Assistant Examiner—Archene A. Turner
Attorney, Agent, or Firm—Cushman, Darby & Cushman

[57] ABSTRACT

Ceramic, non-glazed flooring tile consisting of a comparatively thick ground layer and a comparatively thin upper layer, wherein the upper layer with a pattern layer having a colour and/or grain size different from the top layer in the top layer or on at least part of the top layer.

4 Claims, 2 Drawing Sheets

CERAMIC FLOORING TILE, SET OF MUTUALLY DISTINGUISHABLE FLOORING TILES

The invention relates to a ceramic, non-glazed flooring tile consisting of a comparatively thick ground layer and a comparatively thin upper layer. The invention further relates to a set of ceramic, non-glazed flooring tiles, whereby each tile consists of a comparatively thick ground layer and a comparatively thin upper layer, which tiles of one set are different from one another but still match because of the pattern and/or the colour of the upper layer. The invention also relates to a method for producing such a set of flooring tiles and to a device for carrying out said method.

From the Dutch patent application No. 6707021, in the name of Mosa, there is known a method and device for pressing ceramic tiles consisting of two layers. Said known method is especially aimed at providing an upper layer having a flame pattern on the ground layer by mixing the components of the upper layer irregularly and providing them evenly distributed over the surface of the ground layer. Although this principle has been applied successfully for years, it has now appeared to be possible to produce flooring tiles whereby the design of the pattern is such that it better meets the requirements of modern time, viz. such a pattern as is felt to be a natural pattern and a method for the productioner to be carried out efficiently. Also from the German "Auslegeschrift" 1,182,572 a device is known for producing flamed ceramIc tiles comprising a ground layer and an upper layer.

From the German "Offenlegungsschrift" 2,529,721 there is also known a method and device for producing ceramic tiles consisting of two layers, whereby the upper layer is provided in the shape of a certain pattern. In order to provide the upper layer on the ground layer the fine-grained material is provided on the material of the ground layer via a sieve, and in order to obtain a certain pattern in the upper layer certain places in the sieve are closed or made smaller, so that in these places no material or only a small quantity of the material for the upper layer is provided on the ground layer. Although this method may lead to a certain, desired pattern, its disadvantage is that the second function of the upper layer, viz. providing a tile with the desired mechanical properties, such as water-repellency, cannot be obtained by such an upper layer. According to the above-mentioned Offenlegungsschrift a glaze is therefore used in the upper layer or a coating of glaze is provided on the upper layer. In the tiles according to the present invention such a glaze is not necessary, as a result of which a less glossy, more natural flooring tile is obtained without affecting the mechanical and physical properties of the tile because in the flooring tile according to the invention a water-repellent action is obtained by means of the upper layer without a glaze being present therein or thereon. From the U.S. Pat. No. 1,390,244 there is known a method for producing concrete tiles by starting from a mixture of cement and sand, whereby an upper layer in the form of a paste is provided on a ground layer, after which the whole is allowed to cure by putting a fabric in the mould with on it cement containing a colorant, which fabric is removed after a first pressing operation. Also from the U.S. Pat. No. 1,727,580 there is known a method and device for producing concrete tiles. A number of plastic layers of cement with colorants merging into one another are pressed together on a ground layer thereby. A device for pressing concrete tiles is known from the European patent application No. 0,024,237. In methods for producing tiles a distinction should be made between ceramic tiles, such as produced according to the invention, and concrete tiles. The concrete tiles are obtained by allowing a wet mixture of sand, gravel and cement to cure on the basis of chemical reactions at room temperature, water playing an important role. Ceramic tiles, on the other hand, are produced by heating dry material, which does not contain cement, to a temperature above 1000° C., especially to about 1250° C. During baking the grains cake together. The ceramic tiles are produced on the basis of a physical process whereby the diffusion plays an important role. Another essential difference can be observed in the colorants to be used. Because in the method for producing ceramic tiles a heating is carried out only inorganic colorants which are resistant to heat can be used thereby, whereas in concrete mixtures also colorants of organic origin can be used.

The purpose according to the invention is to obtain ceramic flooring tiles tiles forming a set of flooring tiles, viz. flooring tiles which are different from one another as regards colour and pattern within a set, but do match within a set, so that an impression as of a natural product is obtained. Furthermore the purpose according to the invention is to obtain flooring tiles which are not glazed and yet have the desired properties as regards wear-resistance, dirt and water repellency and the like.

The purpose is achieved with a ceramic tile as mentioned in the preamble and it is characterized in that the upper layer is composed of a top layer with a pattern layer having a colour and/or grain size deviating from the top layer in the top layer or on at least part of the top layer. With this ceramic tile a set of flooring tiles is composed, whereby the tiles of one set are different from one another but still match. In the ceramic tiles according to the invention the top layer has a certain pattern of several colours, without this leading to the formation of stripes, which pattern is different in the various tiles of one set. Said top layer also provides the tile with the desired mechanical properties, as is done by the glaze in different tiles. In order to give the tile another pattern, e.g. a flame motif or a motif of marble, in addition to the pattern caused by the top layer, the pattern layer is provided, for which purpose the material of the top layer, but now in another colour and possibly another grain size, is provided on a part of the top layer, after which the tile material is compressed, dried and baked, as a result of which the top layer and the pattern layer merge together, whereby the pattern layer does not project above the top layer, at least not perceptibly.

The method for producing a set of flooring tiles according to the invention is carried out by filling a mould with material for the ground layer and providing the material for the upper layer thereon by means of one or more slides and via one or more sieves, whereby the material for the upper layer is metered from several containers, which contain ceramic material with several coloring additives, and the distribution of the material from the various containers is varied, the material is compressed and heated to caking, and the method according to the invention is characterized in that the upper layer is provided on the ground layer in two parts, viz. first a top layer and then a pattern layer on or in the top layer, whereby the pattern layer is provided by means of a rotating and movable belt.

The nature of the material for the ground layer and the top layer is the same and consists of a clay-containing material, mainly composed of clay and kaolin, a fluxing agent and sand or quartz meal. The material for the upper layer, i.e. both the top layer and the pattern layer, contains a little more fluxing agent and has a finer grain size, so that the upper layer is of a better quality and better resistant to staining and has a lower absorbing power than the ground layer after drying and baking. The ground layer of a tile according to the Invention e.g. has a water-absorbing power of 0.3% and the upper layer has a water-absorbing power of 0.1% or less. The material of which the ground layer is formed consists of about 50% clay and kaolin, 28% fluxing agents (glazing agents such as felspar) having a maximum grain size of 63 $\mu$m and of about 22% sand (quartz) having a maximum grain size of 63 $\mu$m. The material of which the upper layer is formed also consists for about 50% of clay and kaolin, but has more fluxing agent than the material for the ground layer, viz. 30% fluxing agent having an average grain size of 7 $\mu$m and the balance, viz. 20%, consists of quartz meal. More than 70% of said quartz meal for the upper layer is larger than 10 $\mu$m, about 50% is smaller than 32 $\mu$m and the balance is smaller than 63 $\mu$m. The clay and the kaolin may have a particle size varying from dust to about 1 mm.

The basic material for both the ground layer and the upper layer is spray-dried to a remaining moisture content of about 7.5% by weight.

The flooring tiles according to the invention are produced by filling a mould with the material for the ground layer and providing the material for the upper layer in two steps thereon, viz. first the top layer and then the pattern layer, compressing, removing and baking the semi-product thus obtained, whereby the method and device according to the invention are especially aimed at providing the top layer on the ground layer and at providing the pattern layer.

The method and device according to the invention will be further explained hereinafter with reference to the following description whereby reference is made to the accompanying drawing, whereby:

BRIEF DESCRIPTION OF THE DRAWINGS

FIG. 1 illustrates that part of the device with which the ground layer and the top layer are formed and in FIG. 2 the accent is laid on the part of the device with which the pattern layer is provided on the mixture of ground layer and top layer already formed. In FIG. 2 that part of FIG. 1 has therefore been copied, such as the mould 1, the stamps 2 and 3, the slide 4 and the feed hopper 5, necessary in order to obtain a good understanding of the device according to FIG. 2.

FIG. 1 illustrates a mould 1 in which a lower stamp 2 and an upper stamp 3 are provided. By means of the slide 4 a material for the ground layer, having a composition as indicated above, is provided in a metered quantity from the container 5 in the mould 1 on the lower stamp 2. The lower stamp 2 is movable in the direction of the arrow 33 and the lower stamp 2 is adjusted to the desired depth. The slide 4 is then moved back to the original position and strickles off the material for the ground layer. Then the stamp 2 is moved further downwards so that the material for the top layer can be provided thereon, in the cavity on the ground layer already provided on the lower stamp 2. In order to provide the top layer the sieve 6 is placed above the opening of the mould 1, after which the strewing bin 9 filled with material for the top layer is moved to above the sieve 6 and the material from the strewing bin 9 is provided, via the sieve 6, on the material for the ground layer. Subsequently the slide 7 is put in the starting position, as a result of which also the sieve 6 is put in the starting position. Then the strewing bin 9 returns to its starting position in order to be refilled. The driving mechanisms for moving the slides 4 and 6 in the respective directions 31 and 34 and for moving the stamps 2 and 3 in the respective directions 33 and 32 are not illustrated in the drawing. After the mixture for the top layer has been provided the pattern layer is put on by means of the device as is illustrated in FIG. 2. For this purpose the pattern belt 53 is filled with the material for the pattern, from the strewing bins 49 and 50 during the forward movement of the second slide 7, with which the top layer is provided and subsequently, during the backward movement of the second slide 7, the material for the pattern layer is strewn on the top layer which is already present The description of the operation of the device according to FIG. 2, especially the filling of the pattern belt 52, will be explained hereinafter.

After the pre-form for the tile, consisting of ground layer, top layer and pattern layer, has been composed the upper stamp 3 is provided on the mould 1 and after venting compression takes place. Subsequently the stamp 3 is moved upwards, as well as the stamp Z, so that the compressed tile will lie with its lower side on the upper side of the mould 1, and for refilling the slide 4 is moved to the right and as a result of that the compressed tile is removed, after wich the mould 2 is refilled. The compressed pre-form for the flooring tile is then dried and baked and thus the flooring tile according to the invention is obtained.

Figure 1:
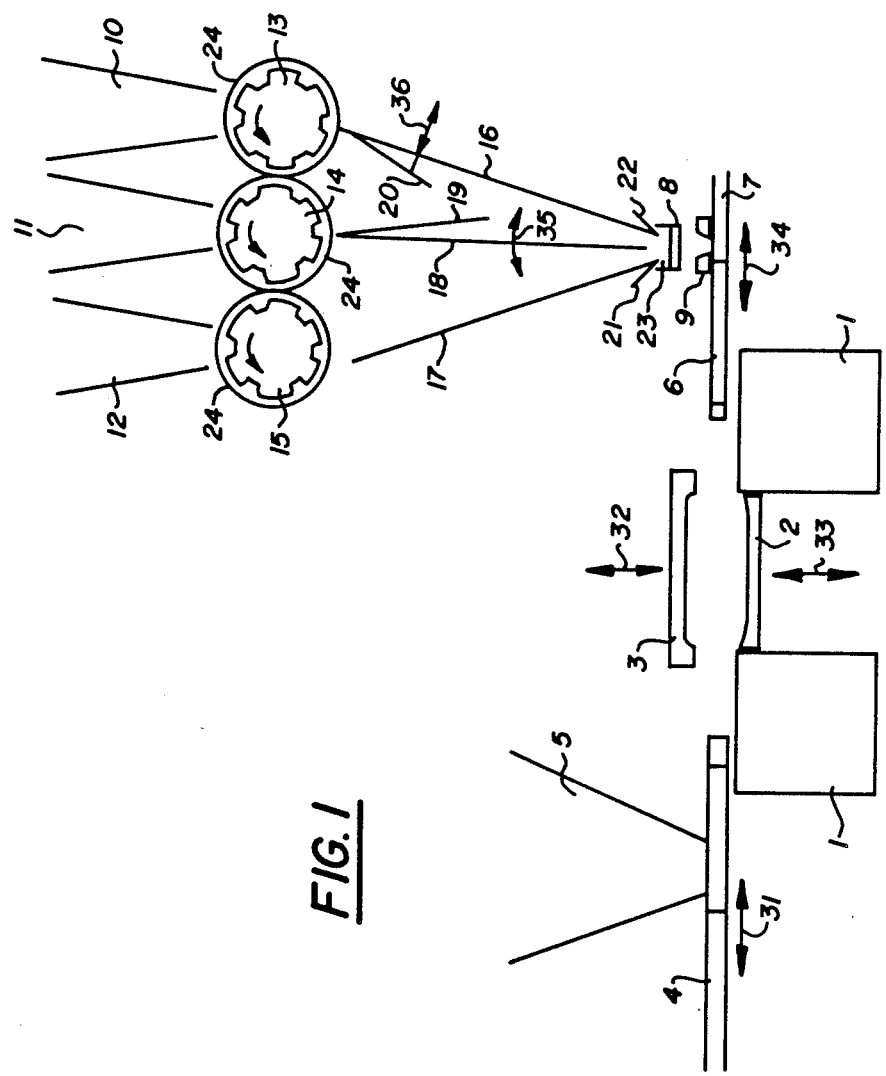
FIG. 1 illustrates the device for providing the top layer on the ground layer and FIG. 2 illustrates the additional device for providing the pattern layer.

FIG. 1 further illustrates how the top layer is provided on the ground layer, so that a pattern is obtained in the top layer, caused by several colours and by the way said top layer is composed. The feeding mechanism for material for the top layer consists of a second slide 7 with a sieve 6, which slide 7, in the starting position, is in direct or indirect communication with the discharge 23 of several containers 10, 11 and 12 containing several coloured basic materials for the top layer. Preferably the containers 10, 11 and 12 are provided with several rotatable cellular valves 13, 14 and 15. Said cellular valves 13, 14 and 15 are rotatable over 60°. Although three containers and three valves are illustrated in the drawing, the method may also be carried out with two, four or more containers and cellular valves. A further variation in the arrangement of the various grains can be obtained by changing the length of the downward travel and the direction of the downward travel of the grains and this may happen in the hopper with the walls 16 and 17 and discharge opening 23 by tilting plate 18 in the direction of arrow 35 or by tilting the plate 20 in the direction of arrow 36. Also it will be possible to vary the direction of the plate 19. Finally it will also be possible to adjust the sine plates 21 and 22 near the discharge opening 23 in such a manner that the discharge pattern of the granular material of which the top layer is formed is always arranged differently in the strewing bin 9, which is filled via the sieve 8. Sieve 8 serves to stop grains which are too large and furthermore to feed the material, which is supplied from the containers to the strewing bin 9, strewn to the bin, whilst said material is again strewn, via a sieve 6, over the material for the ground layer.

The cellular valves 13, 14 and 15 are provided with openings 24, which are filled with material from which the top layer is formed, which material is supplied via the hoppers 10, 11 and 12. Said hoppers contain the ceramic material as already described before, viz. consisting of about 50% clay and kaoline, about 30% fluxing agent and about 20% quartz meal having a grain size smaller than the grain size of the material for the ground layer, whilst the material for the top layer also contains 0–12% colorant. The quantity of colorant is deducted from the fluxing agent and/or the quartz meal and said colorants consist of oxides, ores or synthetic colorants which are known to a specialist in the field of flooring tiles. By rotating the openings 24 in the cellular valves 13, 14 and 15 one opening is emptied into the chute and the material flows via the plates 16, 17, 18, 19 and 20 towards the outlet opening 23, and is furthermore directed near the outlet opening 23 by means of the plates 21 and 22. By adjusting and varying the various plates it is possible to obtain constantly differing distributions of the various colours and top layers with constantly different patterns being obtained.

Figure 2:
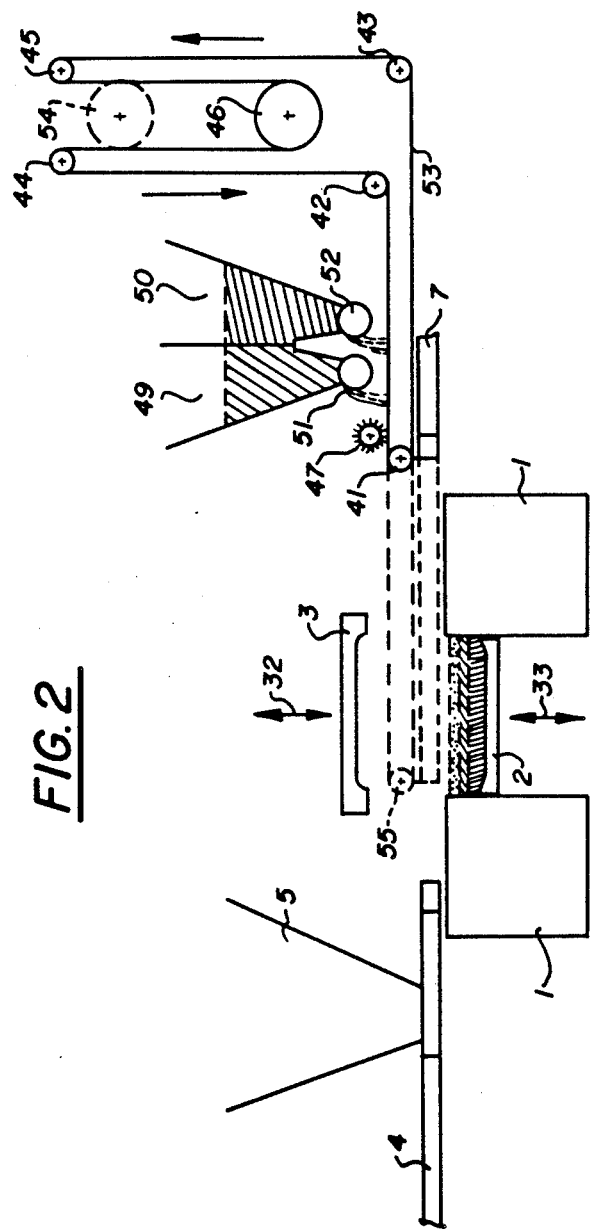

FIG. 2 illustrates in a comparative manner the equipment with which the pattern layer is provided on the top layer.

By means of said equipment the material for the pattern is strewn on the pattern belt 53 from several containers or strewing bins 49 and 50 via two metering rollers 51 and 52, said material having different colours and/or grain sizes, with the excess material being brushed off with the brush 47 and exhausted.

The lower mould 2 is illustrated in already filled condition, i.e. ground layer, top layer and pattern material, present in the mould 1 and the roller 41 is mounted on the front side of the second slide 7, coupled to the pattern belt 53 with which the pattern layer is provided. The illustrated situation is the moment at which the second slide 7 has just returned to its starting position. During the return stroke the material for providing the pattern has been strewn on the top layer. After compression the tile is ejected by the first slide 4 and at the same time the mould 1 is refilled with the material for the ground layer 4 from the feed hopper 5, and the top layer is provided as described above. As soon as the first slide 4 is withdrawn, the second slide 7, on which the roller 4 is mounted, will make the ingoing stroke. During said ingoing stroke the pattern belt is filled by strewing by means of the metering roller 51 and/or 52. At first the roller 41 does not rotate but the rollers 42, 43, 44 and 45 do, whilst the roller 46 moves towards the dotted position 54 during the ingoing stroke of the second slide 7, whereby the pattern belt and the roller 41 move into the dotted position 55. Excess material is brushed off the pattern belt by the brush 47 and exhausted. As soon as the second slide 7 is in the pulled-out position the top layer is strewn from the bin 9 via a sieve 6, after which the entire second slide 7 commences its return stroke. During said return stroke the rollers 42 and 44 are stationary and the rollers 41, 43, 45 and 46 rotate, whilst besides the roller 46 moves back from position 54 to the starting position 46. During said return stroke the material for the pattern is strewn on the top layer. During the next ingoing stroke of the slide 7 of the next cycle material for the next pattern layer is provided on the pattern belt 53 from the strewing bins 49 and 50. After compression and ejection the cycle can start once more.

The strewing bins 49 and 50 can be subdivided transversely into several compartments, as a result of which there is a possibility of providing several colours and/or grain sizes beside and behind each other. By means of accurately adjustable slits and speeds of the metering rollers 51 and 52 and by adjusting the speed of the pattern belt 53 it will be possible to provide various pattern layers reproducibly on the top layer.

It will be apparent that also other embodiments for providing the pattern layers will be possible, whereby indeed use is made of the pattern belt 53, but whereby the metering on the belt is done in a different manner, or whereby the pattern in stock in the form of the pattern layer is provided in one action on the top layer via a sieve or a template.

Furthermore it will be possible that two or more tiles are pressed beside each other in the mould, so that there are additional adjusting possibilities which can be used for varying the place of the ceramic materials, or whereby the top layer is provided in a simpler manner than is illustrated in FIG. 1, because the eventual appearance of the tile is substantially determined by the pattern layer.

What is claimed:

1. A ceramic, non-glazed flooring tile comprised of a ground layer and a comparatively thinner upper layer adhered thereto, said upper layer comprised of a top layer applied directly to said ground layer and a separate pattern layer adhered to said top layer, said pattern layer extending over at least a portion of said top layer and having color and grain size characteristics different from the colors and grain sizes used in said top layer.

2. A flooring tile according to claim 1, wherein the surface of the top layer includes a pattern comprised of several colors.

3. A flooring tile according to claim 2, wherein the pattern is comprised of a plurality of colors, which give a general color impression different from the color of the pattern layer.

4. A set of ceramic non-glazed flooring tiles, whereby each tile in the set is comprised of a ground layer and a comparatively thinner upper layers, the upper layer of each tile of the set including a top layer adhered directly to said ground layer and a separate pattern layer adhered to said top layer, said pattern layer containing a pattern that differs in shape from each other tile in the set.

* * * * *